(12) United States Patent
Biagini et al.

(10) Patent No.: US 9,719,434 B2
(45) Date of Patent: Aug. 1, 2017

(54) LOCOMOTIVE CONTROL SYSTEM HAVING THERMAL MANAGEMENT

(71) Applicant: Electro-Motive Diesel, Inc., LaGrange, IL (US)

(72) Inventors: Douglas Michael Biagini, Washington, IL (US); William Charles Hawkins, Plainfield, IL (US); John Franklin Kral, Plainfield, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 38 days.

(21) Appl. No.: 14/630,534

(22) Filed: Feb. 24, 2015

(65) Prior Publication Data
US 2016/0244072 A1     Aug. 25, 2016

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *F02D 29/02* | (2006.01) |
| *F01N 3/035* | (2006.01) |
| *B61C 17/12* | (2006.01) |
| *B61C 5/00* | (2006.01) |
| *F02D 41/02* | (2006.01) |
| *F02D 41/04* | (2006.01) |

(Continued)

(52) U.S. Cl.
CPC ............... *F02D 29/02* (2013.01); *B61C 5/00* (2013.01); *B61C 17/12* (2013.01); *F01N 3/035* (2013.01); *F02D 29/06* (2013.01); *F02D 41/024* (2013.01); *F02D 41/042* (2013.01); *F02D 41/083* (2013.01); *F02D 2041/026* (2013.01); *F02D 2200/0802* (2013.01); *F02D 2250/24* (2013.01); *Y02T 30/10* (2013.01)

(58) Field of Classification Search
CPC ........................................................ B61C 5/04
See application file for complete search history.

(56) References Cited

U.S. PATENT DOCUMENTS

| | | |
|---|---|---|
| 6,422,001 B1 | 7/2002 | Sherman et al. |
| 6,650,993 B2 | 11/2003 | Wolf et al. |

(Continued)

*Primary Examiner* — Lail Kleinman
(74) *Attorney, Agent, or Firm* — Finnegan, Henderson, Farabow, Garrett & Dunner, LLP

(57) ABSTRACT

A control system for a machine having an engine, a first alternator, a second alternator, and an aftertreatment system is disclosed. The control system may include a sensor associated with the aftertreatment system and configured to determine a temperature of exhaust passing through the aftertreatment system, and a controller in communication with the sensor and connectable to the first and second alternators. The controller may be configured to determine an available power output of the first alternator, determine a load increase of the engine needed to raise the temperature of the exhaust to an operating temperature of the aftertreatment system, and selectively connect the first alternator to a power consumer to achieve the load increase when the available power output of the first alternator is greater than the load increase. The controller may be further configured to selectively connect the second alternator to the power consumer to achieve the load increase when the available power output of the first alternator is less than the load increase.

18 Claims, 3 Drawing Sheets

(51) Int. Cl.
*F02D 41/08* (2006.01)
*F02D 29/06* (2006.01)

(56) References Cited

U.S. PATENT DOCUMENTS

| | | |
|---|---|---|
| 6,871,490 B2 | 3/2005 | Liang et al. |
| 6,912,848 B2 | 7/2005 | Bedapudi |
| 6,928,972 B2 | 8/2005 | Biess et al. |
| 6,941,218 B2 | 9/2005 | Wolf et al. |
| 7,370,470 B2 * | 5/2008 | Graupner ............ F02D 41/0245 |
| | | 123/681 |
| 7,854,114 B2 | 12/2010 | England |
| 7,953,541 B2 | 5/2011 | Roth et al. |
| 8,549,838 B2 | 10/2013 | Sujan et al. |
| 2004/0122586 A1 | 6/2004 | Wolf et al. |
| 2005/0268955 A1 * | 12/2005 | Meyerkord ............. F01N 5/025 |
| | | 136/205 |
| 2008/0121136 A1 | 5/2008 | Mari et al. |
| 2012/0090301 A1 * | 4/2012 | Sujan ................... B60W 10/06 |
| | | 60/277 |
| 2014/0139016 A1 * | 5/2014 | Lovercheck ............ B60L 1/003 |
| | | 307/9.1 |

* cited by examiner

LOCOMOTIVE CONTROL SYSTEM HAVING THERMAL MANAGEMENT

TECHNICAL FIELD

The present disclosure relates generally to a control system, more particularly, to a locomotive control system having thermal management.

BACKGROUND

Many locomotives employ engines that combust fuels to generate mechanical and/or electrical power for propelling the locomotive and powering its various support and control systems. Such fuel-consuming engines exhaust a complex mixture of pollutants, including particulate matter, oxides of nitrogen, and other constituents. To satisfy increasingly stringent exhaust emission standards and to meet fuel efficiency goals, locomotive manufacturers have implemented various aftertreatment systems and control strategies. Typical aftertreatment systems incorporate one or more filters, catalysts, and/or other devices that utilize heat generated by the associated engine to reduce, convert, burn, or otherwise treat pollutants in the exhaust. Some control strategies include placing loads on the associated engine to heat the aftertreatment system.

Most aftertreatment devices must achieve a minimum temperature in order to sufficiently reduce pollutants (e.g., a light-off temperature, an activation temperature, a regeneration temperature, etc.), and achieving this minimum temperature can be difficult when the engine is not producing a sufficient amount of heat. Circumstances when the engine may not produce a sufficient amount of heat include, for example, after the engine has been restarted following a period of rest and when the engine is running at idle speeds. However, locomotive operators often run the engine at idle speeds for extended periods of time instead of shutting it down to avoid the possibility that it will be difficult to restart the engine and/or to avoid cutting power to various systems and devices that are powered by the engine during idle operations (e.g., cab heating/cooling, compressed air for brakes, electrical systems, etc.). During these periods when the load on the engine is low, the engine may not produce enough heat for the aftertreatment system to effectively reduce emissions and may continue to consume fuel with the locomotive having zero speed, thereby lowering the average fuel efficiency of the locomotive.

One attempt to increase the temperature of an aftertreatment device is described in U.S. Pat. No. 6,422,001 (the '001 patent) that issued to Sherman et al. on Jul. 23, 2002. The '001 patent describes a method of regenerating a particulate filter of a hybrid electric vehicle. When the backpressure of the exhaust system exceeds a threshold, a controller increases the speed of the engine and applies other loads to the engine to increase the temperature of the particulate filter. The loads are applied to the engine by increasing the power output of a generator driven by the engine by connecting the generator to a power dissipating device such as a resistor. The controller controls the engine speed and load according to a map that correlates a filter regeneration temperature to an engine speed and torque output for achieving that temperature.

Although the system of the '001 patent may be somewhat effective at increasing the temperature of an after treatment device, it may not be optimal. In particular, the system of the '001 patent is directed to the periodic regeneration of a particulate filter and may not be applicable to increasing and maintaining the temperature of an aftertreatment system that includes other devices that should constantly be above their activation temperatures. The system of the '001 patent may also fail to consider the current temperature of the aftertreatment system in determining how much to increase the load on the engine, which may lead to wasteful heating of the aftertreatment system. Further, the system of the '001 patent may not account for the temperature needs of aftertreatment devices during idle conditions, which may lead to insufficient or wasteful heating of the exhaust system.

The system of the present disclosure solves one or more of the problems set forth above and/or other problems of the prior art.

SUMMARY

In one aspect, the present disclosure is directed to a control system for a machine having an engine, a first alternator, a second alternator, and an aftertreatment system. The control system may include a sensor associated with the aftertreatment system and configured to determine a temperature of exhaust passing through the aftertreatment system, and a controller in communication with the sensor and connectable to the first and second alternators. The controller may be configured to determine an available power output of the first alternator, determine a load increase of the engine needed to raise the temperature of the exhaust to an operating temperature of the aftertreatment system, and selectively connect the first alternator to a power consumer to achieve the load increase when the available power output of the first alternator is greater than the load increase. The controller may be further configured to selectively connect the second alternator to the power consumer to achieve the load increase when the available power output of the first alternator is less than the load increase.

In another aspect, the present disclosure is directed to a method of operating a machine having an engine, a first alternator, a second alternator, and an aftertreatment system. The method may include directing exhaust away from the engine through the aftertreatment system, determining a temperature of the exhaust, determining an available power output of the first alternator, and determining an engine load increase needed to raise the temperature of the exhaust to an operating temperature of the aftertreatment system. The method may further include selectively connecting the first alternator to a power consumer to achieve the engine load increase when the available power output of the first alternator is greater than the engine load increase, and selectively connecting the second alternator to the power consumer to achieve the engine load increase when the available power output of the first alternator is less than the engine load increase.

In yet another aspect, the present disclosure is directed to a locomotive. The locomotive may include an engine, a first alternator driven by the engine, a second alternator driven by the engine, an aftertreatment system connected to receive exhaust from the engine, and a sensor associated with the aftertreatment system and configured to determine a temperature of exhaust passing through the aftertreatment system. The locomotive may further include a throttle selector movable from an idle position through a range to a maximum position to affect a speed of the engine, one or more power consumers connectable to at least one of the first and second alternators, and an auxiliary power source connectable to the one or more power consumers. The locomotive may further include a controller in communication with the sensor and connectable to the first and second alternators.

The controller may be configured to determine an available power output of the first alternator, determine an available power output of the second alternator, and determine a load increase of the engine needed to raise the temperature of the exhaust to an activation temperature of the aftertreatment system. The controller may be further configured to selectively connect the first alternator to at least one of the one or more power consumers to achieve the load increase when the available power output of the first alternator is greater than the load increase, and selectively connect the second alternator to the at least one of the one or more power consumers to achieve the load increase when the available power output of the first alternator is less than the load increase and the available power output of the second alternator is greater than the load increase. The controller may be further configured to track a time elapsed when the throttle selector is moved to the idle position, determine a load generated by one or more power consumers, and selectively shut down the engine and activate the auxiliary power source only when the load generated by the one or more power consumers is less than an output capacity of the auxiliary power source and the temperature of the exhaust passing through the aftertreatment system is below a threshold temperature for limiting a temperature the aftertreatment system.

DETAILED DESCRIPTION

Figure 1:
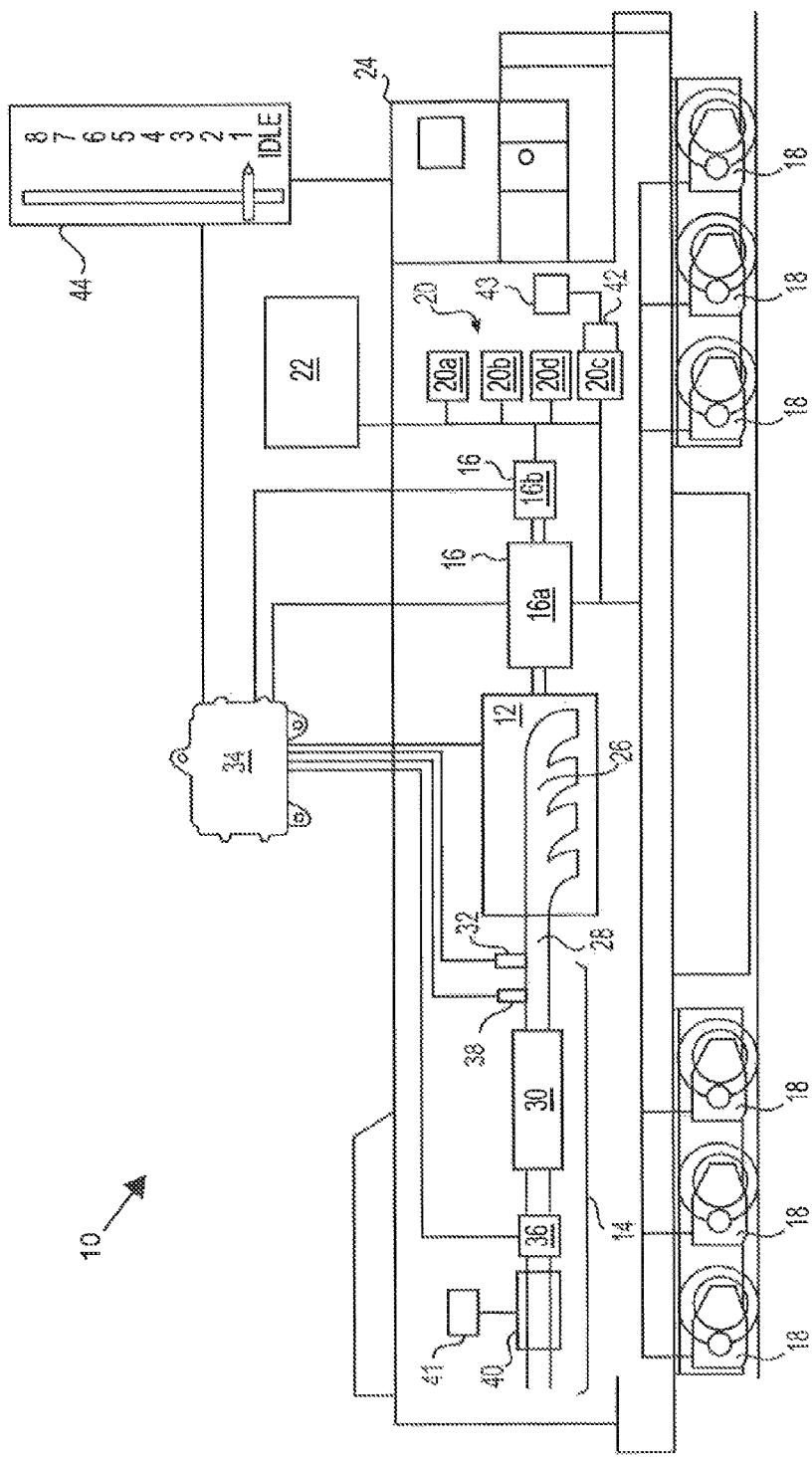
FIG. 1 is a diagrammatic illustration of a machine incorporating an exemplary disclosed power system.

FIG. 1 illustrates an exemplary power system 10. For the purposes of this disclosure, power system 10 is depicted and described as a mobile machine, for example a locomotive. Power system 10 may include, among other things, at least one internal combustion engine 12 and an aftertreatment system 14 configured to receive combustion products (e.g., exhaust) from engine 12. Engine 12 may be configured to combust a mixture of air and fuel to generate a mechanical output that drives one or more alternator(s) 16. Alternators 16 may be driven by engine 12 to provide power to traction devices 18 and/or one or more power consumers 20a-d. Power system 10 may also include an auxiliary power source 22 for supplying power to consumers 20, and a cab 24 for manual control of power system 10.

Engine 12 may be a multi-cylinder internal combustion engine. For example, engine 12 may combust a fuel such as gasoline, diesel fuel, gaseous fuels, etc., to generate a mechanical output and exhaust a complex mixture of pollutants such as oxides of nitrogen (NOx), particulate matter (PM), carbon monoxide (CO), carbon dioxide ($CO_2$), hydrocarbons (HC), etc. These pollutants and other products of combustion generated by engine 12 may be collectively referred to as "exhaust." Combusted air and fuel may exit engine 12 as hot exhaust gases via an exhaust manifold 26 and/or other passage connected to exhaust ports of engine 12 and pass through aftertreatment system 14 before reaching the atmosphere.

Aftertreatment system 14 may include one or more exhaust passages 28 fluidly connected to the cylinders of engine 12, and one or more aftertreatment devices 30 for reducing pollutants in the exhaust. Aftertreatment devices 30 may include, for example, oxidation catalysts, selective catalytic reduction devices, particulate filters (e.g., a DPF or catalyzed particulate filter), etc., for reducing pollutants such as NOx, HC, CO, PM, and/or other exhaust constituents emitted from engine 12. Aftertreatment devices 30 may reduce pollutants most effectively above a minimum temperature, such as an activation temperature, a light-off temperature, a regeneration temperature, or a preferred operating temperature. Aftertreatment devices 30 may reach the activation temperature or other such temperature by absorbing heat from the exhaust flowing from engine 12 through aftertreatment system 14. When a temperature of the exhaust ($T_{AT}$) entering aftertreatment system 14 is below a minimum temperature ($T_1$), aftertreatment devices 30 may be unable to reach or sustain the activation temperature. $T_1$ may correspond to an operating temperature such as an activation temperature, regeneration temperature, light-off temperature, etc. $T_1$ may vary depending on the types of aftertreatment device(s) 30 included in aftertreatment system 14, and may be, for example, about 60-300° C. (e.g., 265° C.).

When $T_{AT}$ is below $T_1$, such as when engine 12 is started under cold start conditions (e.g., after a period of rest or during cold ambient conditions) or under low load, it may be beneficial to artificially increase $T_{AT}$ in order to raise the temperature of aftertreatment devices 30 to surpass $T_1$. To determine $T_{AT}$, aftertreatment system 14 may include a sensor 32 configured to determine the temperature of the exhaust entering aftertreatment system 14 from engine 12. Sensor 32 may include multiple sensors and be disposed within exhaust passage 28 upstream of aftertreatment devices 30. Sensor 32 may also or alternatively be positioned at other locations within aftertreatment system 14 such as downstream of or within aftertreatment devices 30, if desired. Sensor 32 may be in communication with a controller 34, and controller 34 may receive signals from sensor 32 indicative of $T_{AT}$. Sensor 32 may alternatively be configured to determine a temperature of certain components of aftertreatment system 14 (e.g., aftertreatment devices 30), which controller 34 may use to determine whether $T_{AT}$ is above or below $T_1$.

Aftertreatment system 14 may also include a restrictor valve 36 disposed in exhaust passage 28 for selectively restricting the flow of exhaust through aftertreatment system 14. Restrictor valve 36 may be a control valve in communication with and actuated by controller 34 for affecting a backpressure (P), and hence a load, on engine 12. The backpressure P of engine 12 may be determined by one or more sensors 38 in communication with controller 34. Sensor 38 may be an absolute pressure sensor or a pressure differential sensor. For example, sensor 38 may be disposed in exhaust passage 28 near the entrance of aftertreatment system 14. In other embodiments, sensor 38 may be configured to determine the pressure across restrictor valve 36. It is understood that other locations of sensor 38 may be used.

As hot exhaust flows through aftertreatment system 14 from engine 12, the components of aftertreatment system 14 may become hot and radiate heat energy. An energy recovery unit 40 may be disposed within aftertreatment system 14 to recover some of the heat energy given off by the hot components of aftertreatment system 14. Energy recovery unit 40 may be configured to convert heat energy from one or more components of aftertreatment system 14 and convert the heat energy to another useful form of energy, such as electrical energy, which may be used by power system 10 (e.g., supplied to power consumers 20a-d). Energy recovery unit 40 may store recovered energy in an energy storage device, such as a battery, capacitor, or other storage device. In the disclosed embodiment, energy recovery unit 40 includes a thermoelectric generator that stores heat energy as electricity in a battery 41. Electricity stored in battery 41 may be used to power other elements of power system 10, as needed. In other embodiments, energy recovery unit 40 may include heat exchangers, heat pumps, recuperators, and/or other types of energy recovery devices.

Alternator(s) 16 may be driven by the mechanical output of engine 12. Alternator(s) 16 may include multiple individual alternators driven in parallel or in series by engine 12. In some embodiments, each alternator 16 may be used to generate power for different portions of power system 10. For example, the embodiment of FIG. 1 shows a first alternator referred to as a traction alternator 16a driven by engine 12 and connected to controller 34 and traction devices 18. Traction alternator 16a may have a primary function of providing power to traction devices 18, though traction alternator 16a may also be used to power additional portions of power system 10, if desired. For example, traction alternator 16a may also be connected to and operable to provide power to consumers 20, when desired. Each traction device 18 and/or other device driven by traction alternator 16a may produce a load on traction alternator 16a, and the sum of these loads may be referred to as a traction alternator load ($L_{TA}$). As $L_{TA}$ increases or decreases, the load on engine 12 may also increase or decrease proportionally.

The embodiment of FIG. 1 also shows a second alternator 16, referred to as a companion alternator 16b, that may be driven by traction alternator 16a and in communication with controller 34. Companion alternator 16b may be connected to one or more power consumers 20a-d and serve a primary function of providing power to consumers 20. It is understood, however, that companion alternator 16b may provide power to additional portions of power system 10, if desired. Each power consumer 20 and/or other device powered by companion alternator 16b may produce a load on companion alternator 16b, and the sum of these loads may be referred to as a companion alternator load ($L_{CA}$). As $L_{CA}$ increases or decreases, the load on engine 12 may also increase or decrease proportionally.

Traction devices 18 may include one or more devices configured to provide mechanical power to propel power system 10. For example, traction devices 18 may include one or more alternating current (AC) traction motors powered by traction alternator 16a. It is understood that traction devices 18 may alternatively include direct current (DC) motors, if desired. When powered by traction alternator 16a, traction devices 18 may drive wheels along a rail (e.g., adhesion rail, rack rail, etc.) to propel power system 10. In other embodiments, traction devices may drive wheels along a ground surface, track systems, crawler systems, etc.

Power consumers 20a-d may be powered by companion alternator 16b and include various consumers of electrical power associated with power system 10. Power consumers 20a-d may include devices that support the operation of engine 12, provide braking of traction devices 18, provide amenities to cab 24. Such devices may produce a load on companion alternator 16b, thereby producing a load on engine 12. Each device included within power consumers 20a-d may be associated with a separate circuit having a circuit breaker controllable by the operator and/or controller 34.

For example, power consumers 20a may include a compressed air system (e.g., including air compressors, dryers, conduits, valves, reservoirs etc.), blowers, radiator fans, etc., which may be directly powered with AC current by companion alternator 16b. Power consumers 20b-d may receive electrical power from companion alternator 16b that has been converted to DC current and regulated to a desired voltage.

Power consumers 20b may include devices that place loads on companion alternator 16b that are critical to the effective operation of power system 10 and receive priority when power from companion alternator 16b is limited. Critical loads may be generated by devices such as, for example, interior and/or exterior lights, brake systems (e.g., service brake, emergency brake, etc.), electronic control systems (e.g., controllers, control modules, ECUs, computers etc.), communication systems (e.g., with locomotives in a consist, with a dispatch, with cars in a train, etc.), power controls (e.g., reverser, throttle, etc.), gauges (e.g., pressure gauges, fuel gauges, power gauges, etc.), AC/DC converters, voltage regulators, etc. It is understood that other devices than those mentioned above may produce critical loads.

Other devices that place loads on alternators 16 loads may include components of a dynamic braking system, such as one or more dynamic brake grids 20c. Dynamic brake grids 20c may include resistive elements connectable to traction devices 18 and alternators 16. When the operator applies the service brake, field portions of traction devices 18 are connected to traction alternator 16a and armature portions of traction device 18 are driven by the wheels of power system 10. Dynamic brake grids 20c may be connected to traction devices 18 during braking, thereby placing a large load on traction devices 18, which are acting as generators, to slow power system 10. Loads on alternators 16 (e.g., $L_{AT}$ and $L_{CA}$) may also be increased by connecting dynamic brake grids 20c across alternators 16, thereby also increasing the load on engine 12. Dynamic brake grids 20c may receive electrical energy in the form of current from alternator(s) and dissipate heat energy.

Power produced by traction devices 18 during braking or generated by alternators 16 may be dissipated as heat created by the current passing through dynamic brake grids 20c. In the example of FIG. 1, an energy recovery unit 42 may be connected to dynamic brake grids 20c to recover heat energy generated during braking and/or when dynamic brake grids 20c are used to increase the load on engine 12. For example, energy recovery unit 42 may be a thermoelectric generator. Recovered heat energy may be converted to a useful form of energy (e.g., electricity) and stored in a battery 43 or supplied to other components of power system 10 Fans, cooling fins, heat exchangers, and/or other cooling devices may also or alternatively be connected to dynamic brake grids 20c to protect the resistive elements from overheating.

Power consumers 20d may include devices that place loads on companion alternator 16b that are non-critical to the effective operation of power system 10 under certain circumstances (e.g., during low-power modes) and may receive reduced power when priority is to be given to critical loads. Power consumers 20d may include devices that provide amenities to cab 24 such as, for example, air conditioning systems, heating systems, heated windows, heated lavatories, etc. Power consumers 20d may further include other devices that produce non-critical loads, such as air dryers for compressed air systems and dosing pumps for aftertreatment system 14. It is understood that other devices may produce non-critical loads, and that fewer or other devices than those listed may produce non-critical loads.

Auxiliary power source 22 may provide power to consumers 20a-d instead of alternators 16, if desired, or when engine 12 is shut down and is not driving alternators 16. For example, in some embodiments, auxiliary power source 22 may be configured to run at all times that engine 12 is running, and cab 24 may include a switch (or other control device) that the operator may use to choose between companion alternator 16b and auxiliary power source 22 for providing power to consumers 20a-d. In other embodiments, auxiliary power source 22 may be automatically activated by controller 34 under certain circumstances when engine 12 is shut down. When controller 34 automatically shuts down engine 12, controller 34 may also activate auxiliary power source 22 to continue providing power to consumers 20a-d. When engine 12 is shut down by the operator, auxiliary power source 22 may remain shut down until activated by the operator.

Auxiliary power source 22 may be an engine-powered generator, such as an auxiliary power unit (APU), or other source of electrical power such as a battery bank. In some embodiments, auxiliary power source 22 may combust fuel from the same fuel source as engine 12. Auxiliary power source 22 may be smaller than engine 12 and have an output capacity that is less than engine 12, thereby consuming less fuel and producing less emissions. Auxiliary power source 22 may also include a separate aftertreatment system for limiting emissions and adhering to applicable regulations. In other embodiments where auxiliary power source 22 is a battery bank, it may include one or more batteries that are rechargeable by alternator(s) 16. It is understood that auxiliary power source 22 may include other devices for generating auxiliary power.

Cab 24 may function as an operator station and include various control devices for operating power system 10. For example, cab 24 may include throttle selector 44 in communication with controller 34 that is configured to affect a speed of engine 12. Throttle selector 44 may embody a switch, dial, slide, handle, knob, lever, pedal, or any other type of control device. In the disclosed embodiment, throttle selector 44 may be movable from an idle position through a range to a maximum position. In particular, throttle selector 44 may be movable through a range of throttle notch positions (TN) (e.g., $TN_1$-$TN_8$) that correspond to respective request for motive power, which affect power output levels of engine 12 and/or other sources of power.

Controller 34 may store models, algorithms, maps, and/or lookup tables for determining and/or predicting various parameters of power system 10, such as parameters of aftertreatment system 14 (e.g., temperatures, pressures, soot loads, storage capacities, etc.), engine speed (θ), track speed ($V_T$), etc. Controller 34 may be further configured to track a time elapsed after various commands or operations have commenced. For example, controller 34 may be configured to track a time elapsed after engine 12 is started ($\tau_E$) and a time elapsed after throttle selector 44 is moved to the idle position ($\tau_{IDLE}$). It should be appreciated that controller 34 may include a memory, a secondary storage device, a processor, and any other components for running an application. Controller 34 may include a number of modules that may include a processor, memory, and other components for running applications. Various other circuits may be associated with controller 34, such as power supply circuitry, signal conditioning circuitry, actuator driver circuitry, and other types of circuitry.

Figure 2:
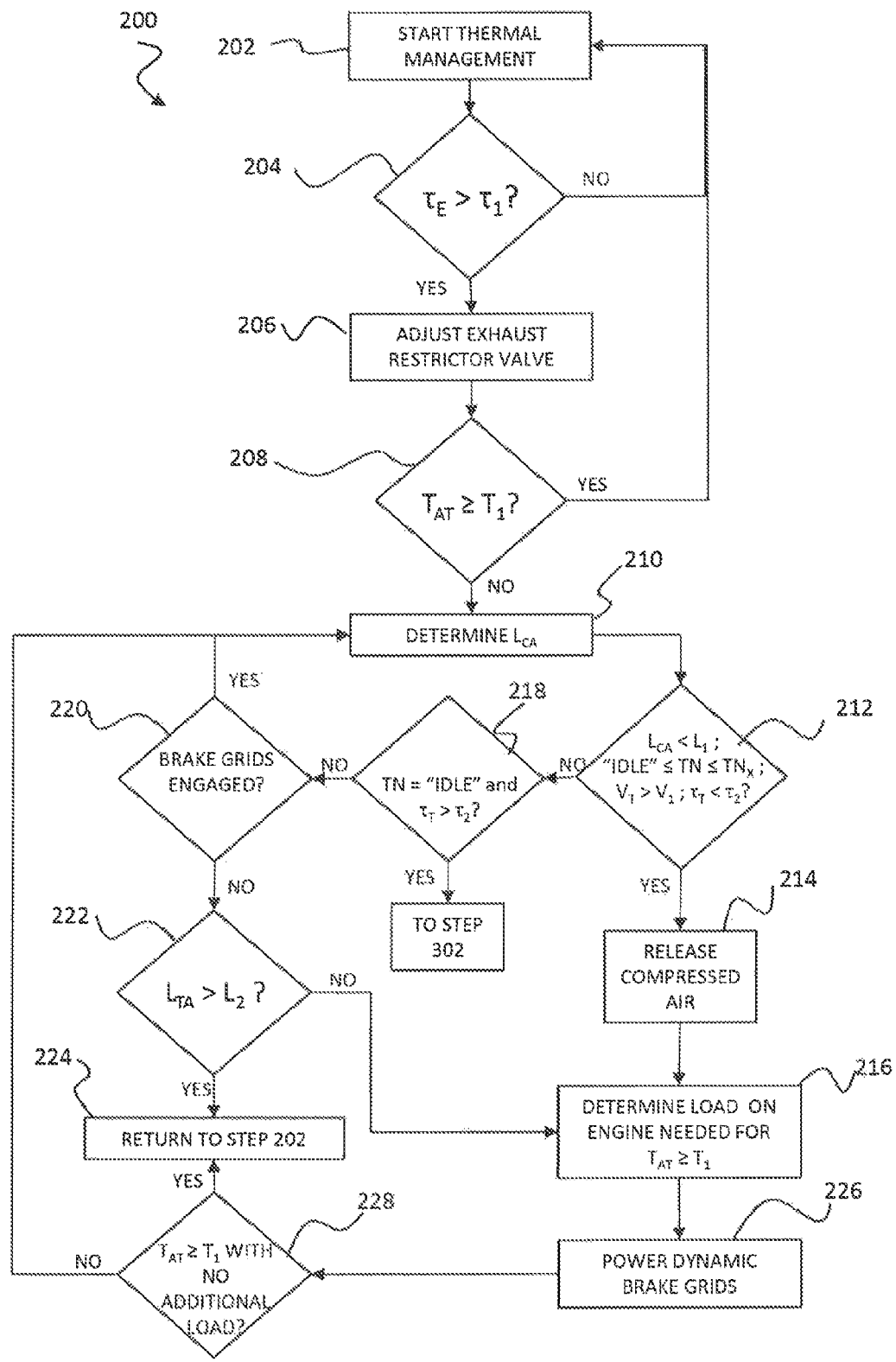
FIG. 2 is a flow chart of an exemplary disclosed thermal management process that may be carried out by the power system of FIG. 1.

Exemplary thermal management and idle reduction processes that may be performed with power system 10 will be discussed below with regard to FIGS. 2-3.

INDUSTRIAL APPLICABILITY

The disclosed power system may be used in any machine that provides power to one or more power consumers and has an exhaust aftertreatment system, where it is beneficial to achieve a minimum temperature of the aftertreatment system while reducing fuel consumption. The disclosed power system finds particular applicability within mobile machines, such as locomotives, that supply power to various onboard power consumers using one or more engine-driven alternators. Exemplary operations of power system 10 will now be described in detail with reference to FIGS. 2-3.

During operation of power system 10, engine 12 may combust a mixture of air and fuel, thereby generating a flow of exhaust gases and a mechanical output for driving alternators 16. Traction alternator 16a may be driven to supply power to traction devices 18 for propelling power system 10. Companion alternator 16b may be driven to supply power to consumers 20a-d throughout power system 10. The exhaust gases from engine 12 may be guided through exhaust manifold 26 and/or exhaust passage 28 into aftertreatment system 14. As the exhaust flows through aftertreatment system 14, aftertreatment devices 30 may reduce, burn, convert, trap, or otherwise treat exhaust pollutants.

When power system 10 is activated, controller 34 may start thermal management process (200) (Step 202) and track a time elapsed ($\tau_E$) since engine 12 was started. Controller 34 may then determine when $\tau_E$ is greater than a threshold time ($\tau_1$) (Step 204) before continuing to the next step of process 200. $\tau_1$ may represent an amount of time after which it is likely that engine 12 will remain active for a long enough period of time so that a proper shutdown sequence under suitable conditions may be carried out. That is, $\tau_1$ may be selected to reduce the likelihood that efforts to increase the temperature of exhaust leaving engine 12 are started and quickly aborted. For example $\tau_1$ may be about 5-60 seconds (e.g., 30 seconds). When $\tau_E$ is greater than $\tau_1$, controller 34 may continue to the next step.

Controller 34 may then determine the temperature ($T_{AT}$) of the exhaust entering aftertreatment system 14 via sensor 32 and the back pressure (P) on engine 12 via sensor 38 and adjust restrictor valve 36 based on $T_{AT}$ and P (Step 206). Controller 34 may adjust restrictor valve 36 based on a map stored in the memory of controller 34 that correlates $T_{AT}$, P, and the position of restrictor valve 36. Controller 34 may be configured to adjust the position of restrictor valve 36 according to the map in order increase the load on engine 12, thereby helping to quickly increase $T_{AT}$ to a temperature ($T_1$) at which aftertreatment devices 30 effectively reduce exhaust constituents.

Controller 34 may then determine whether $T_{AT}$ is greater than or equal to $T_1$ (Step 208). Any time $T_{AT}$ is greater than $T_1$, there may be no need to artificially increase $T_{AT}$ any further since aftertreatment system 14 is receiving exhaust at a temperature sufficient for reducing pollutants. To insure that aftertreatment system 14 is heated only when necessary, thereby avoiding wasteful heating of aftertreatment system 14, controller 34 may determine whether $T_{AT}$ is greater than $T_1$ before proceeding any further. When the determination at step 208 is "yes," controller 34 may return to step 202 as there is no need to further heat the exhaust gases. Process 200 may be restarted with a sampling rate of about 1 second to continuously monitor $T_{AT}$ and insure that pollutants in the exhaust receive constant treatment. When the determination at step 208 is "no," controller 34 may proceed to the next step of process 200.

To help $T_{AT}$ reach $T_1$ sooner, controller 34 may take additional measures to increase the load on engine 12 of power system 10. For example, controller 34 may selectively connect companion alternator 16b or traction alternator 16a to an additional power consumer 20a-d to increase the load on engine 12. Before taking action, controller 34 may first determine whether loads being placed on alternators 16 by power system 10 are sufficient to increase $T_{AT}$ to $T_1$ without further assistance. For example, controller 34 may determine the load ($L_{CA}$) on companion alternator 16b from power consumers 20a-d (Step 210). $L_{CA}$ may be a sum of the direct loads (e.g., the loads created by power consumers 20a) and the critical and non-critical loads placed on companion alternator (e.g., the loads created by power consumers 20b-d). Loads created by each power consumer 20a-d may be determined as the product of voltage and amperage demanded by each power consumer 20a-d.

Using a map stored within its memory, controller 34 may then determine whether $L_{CA}$ is less than a threshold load ($L_1$) that corresponds to a maximum allowable load for a given engine speed θ (Step 212). When $L_{CA}$ is less than $L_1$, companion alternator 16b may be below a maximum output level for the current engine speed θ beyond which placing additional loads on companion alternator 16b may cause it to "brown out," or supply an insufficient amount of current to power consumers 20a-d. When controller 34 determines that $L_{CA}$ is less than $L_1$ at step 212, controller 34 may place additional loads on companion alternator 16b without browning out companion alternator 16b.

Controller 34 may also determine at step 212 whether throttle selector 44 is at a threshold position at which engine 12 produces enough power to increase $T_{AT}$ to $T_1$ without an additional load. For example, controller 34 may receive from the operator a throttle selection and compare it to a threshold selection stored within its memory, above which no additional load is needed to increase $T_{AT}$ to $T_1$. Throttle selections may be selections of throttle position TN, and the threshold selection may be a threshold throttle position ($TN_T$) above which no additional load is needed to increase $T_{AT}$ to $T_1$. In the disclosed embodiment, $TN_T$ may be $TN_1$. It is understood, however, that $TN_T$ may be another position of throttle selector 44, if desired.

When throttle selector 44 is moved to a position that is above "idle" and less than or equal to $TN_T$, controller 34 may start a timer for determining whether the current throttle position will likely be maintained. Thus, at step 212, controller 34 may also determine whether the timer has exceeded a threshold time ($\tau_2$) after which the position of throttle selector 44 is likely to be maintained. Before the timer reaches $\tau_2$, controller may continue with process 200 when throttle selector is positioned within the range from "idle" to a second threshold ($TN_X$) that is greater than $TN_1$. In this way, the operator may be allowed to make certain throttle position adjustments without prematurely affecting thermal management decisions made by controller 34. When controller 34 determines at step 212 that the timer has exceeded $\tau_2$, it may be likely that throttle selector 44 will remain in its current position.

Controller 34 may further determine at step 212 whether the track speed ($V_T$) of power system 10 exceeds a minimum threshold speed ($V_1$). It is understood, however, that in other embodiments $V_T$ may be indicative of a ground speed or another type of relative speed of power system 10. When $V_T$ is greater than $V_1$ (e.g., about 1 MPH), power system may be operating under suitable conditions for applying additional loads to companion alternator 16b in order to achieve $T_{AT}>T_1$. When $V_T$ is less than $V_1$, power system 10 may not be moving or may be moving slowly, and controller 34 may avoid powering brake grids 20c with companion alternator 16b.

When the determination at step 212 is "yes," that is, when $L_{CA}<L_1$, "idle"≤TN≤$TN_X$, $V_\tau>V_1$, and $\tau_T<\tau_2$, controller 34 may then release compressed air from an onboard compressed air system (e.g., associated with power consumers 20a) for an amount of time determined to cause an air compressor associated with the air system to begin pumping to replace the compressed air (Step 214). Activating the air compressor may increase the load on companion alternator 16b, thereby increasing the load on engine 12 and raising the temperature of the exhaust. Compressed air may be released by any suitable valve or release point, such as from the main reservoir or through valves in the system, such as, for example, a radar mag-valve. Controller 34 may then determine how much additional load on engine 12, if any, is needed to raise $T_{AT}$ to $T_1$ (Step 216).

At step 216, controller 34 may determine the engine load increase needed to raise $T_{AT}$ to $T_1$ using a map stored in its memory. The map stored in controller 34 may correlate $T_{AT}$ and engine speed θ with an engine load increase needed to raise $T_{AT}$ to reach $T_1$. The engine load increase determined at step 216 may correspond to an additional load needed to be placed on traction alternator 16a and/or companion alternator 16b to result in an increased load on engine 12 that is sufficient to raise $T_{AT}$ to reach $T_1$.

Returning to step 212, when the determination is "no," controller 34 may then determine whether throttle selector 44 is in the "idle" position and whether the time has exceeded $\tau_2$ (Step 218). During idle, engine 12 may consume enough fuel to satisfy $L_{CA}$, $L_{TA}$, and any other load associated with idle operations. As a result, the average fuel efficiency of power system 10 with respect to a distance traveled (e.g., miles per gallon, or MPG) may be reduced and/or fuel penalties associated with fuel consumption during idle operations may be increased.

To avoid increasing the load on companion alternator 16b and/or traction alternator 16a, thereby avoiding an increase in fuel consumption, controller 34 may proceed to an idle reduction process 300 (see FIG. 3) when the determination at step 218 is "yes," that is, when throttle selector 44 is in the idle position after $\tau_2$ is exceeded. When the determination at step 218 is "no," that is, when throttle selector 44 is not in the idle position after $\tau_2$ is exceeded, controller 34 may determine whether brake grids 20c are connected to traction devices 18 (Step 220).

Controller 34 may determine whether brake grids 20c are engaged to traction devices 18 at step 220 to avoid connecting traction alternator 16a to brake grids 20c when either traction devices are already connected for purposes of braking. Further, the possibility that traction alternator 16a or companion alternator 16b will be connected to brake grids 20c after the other has already been connected to brake grids 20c may also be avoided. When the determination at step 220 is "yes," that is, when brake grids 20c are engaged to traction devices 18, controller may return to step 210, re-determine $L_{CA}$, and repeat steps 210-220. When the determination at step 220 is "no," that is, when brake grids 20c are not engaged to traction devices 18, controller may then determine whether a load on traction alternator 16a ($L_{TA}$) is greater than a threshold load ($L_2$) for the current engine speed θ (Step 222).

Controller 34 may determine whether $L_{TA}$ is greater than $L_2$ at step 222 using a map stored in its memory that correlates θ and $L_{TA}$. It is understood, however, that models, algorithms, and other ways of determining whether $L_{TA}$ is greater than $L_2$ may be used. When $L_{TA}$ is greater than $L_2$, that is, when the determination at step 222 is "yes," the power output of traction alternator 16a may be above a threshold power output at which traction alternator cannot be further loaded without "browning out." To avoid browning out traction alternator 16a, controller 34 may return to step 202 when $L_{TA}$ is greater than $L_2$ and restart process 200 (Step 218). When the determination at step 222 is "no," that is, when $L_{TA}$ is not greater than $L_2$, controller 34 may determine an engine load increase needed to raise $T_{AT}$ to $T_1$ at step 216.

Once the needed load at step 216 is determined, controller 34 may, based on $L_{CA}$ and $L_{TA}$ as determined in step 212 and 222, determine whether companion alternator 16b and traction alternator have an available power output capacity to receive the additional load. When the available power output of companion alternator 16b is greater than the engine load increase determined in step 216, controller 34 may selectively connect companion alternator 16b to an additional power consumer (e.g., dynamic brake grids 20c) to achieve the load increase needed to raise $T_{AT}$ to $T_1$ (Step 226). Controller 34 may alternatively determine an available power output of traction alternator 16a based on $L_{TA}$ as determined in step 222. When the available power output of companion alternator 16b is less than the engine load increase needed to raise $T_{AT}$ to $T_1$ and the available power output of traction alternator 16a is greater than the engine load increase needed to raise $T_{AT}$ to $T_1$, controller 34 may selectively connect traction alternator 16a to the additional power consumer at step 226 to achieve the load increase. Controller 34 may attempt to connect companion alternator 16b to the additional load before engaging traction alternator 16a in order to reserve the load capacity of traction alternator 16a for powering traction devices 18, when possible.

The additional power consumer connected during step 226 may include one of power consumers 20a-d. For example, the additional power consumer may be a brake grid 20c. Because brake grid 20c includes resistive elements that may be selectively connected by controller 34 across traction alternator 16a or companion alternator 16b, the desired additional load may be placed on engine 12 via traction alternator 16a or companion alternator 16b without disturbing the operations of the other power consumers 20a, 20b, and 20d. Moreover, brake grid 20c may receive electrical current and output heat, which can be recovered via energy recovery units 40, 42. For example, energy recovery units 40, 42 may include thermoelectric generators or other devices for converting heat energy from exhaust passage 28 and/or brake grid 20c into electricity and store the electricity in batteries 41, 43. When traction alternator 16a or companion alternator 16b is connected to the additional power consumer, controller 34 may return to step 210 and repeat steps 210-224 until the determination at step 224 is "yes," that is, until no additional engine load is needed raise $T_{AT}$ to $T_1$.

After the additional load is placed on either of alternators 16 at step 226, controller 34 may determine, based on the result at step 216, whether a non-zero additional load was needed to (Step 228). Step 228 may provide an additional check on $T_{AT}$ to avoid unnecessary fuel expenditure by ensuring that a non-zero additional load is needed to reach $T_1$. In this way, controller 34 may avoid increasing the load on engine 12 unless $T_{AT}$ is still below $T_1$. For example, when the determination at step 228 is "yes," that is, when no additional engine load is needed to raise $T_{AT}$ to $T_1$ (i.e., when $T_{AT}$ is greater than or equal to $T_1$), controller 34 may return to step 202 and repeat process 200. However, when the determination of step 228 is "no," that is, when an additional load greater than zero is required to raise $T_{AT}$ to $T_1$, controller 34 may return to step 210 and repeat step 210-228 to achieve $T_{AT} > T_1$.

Figure 3:
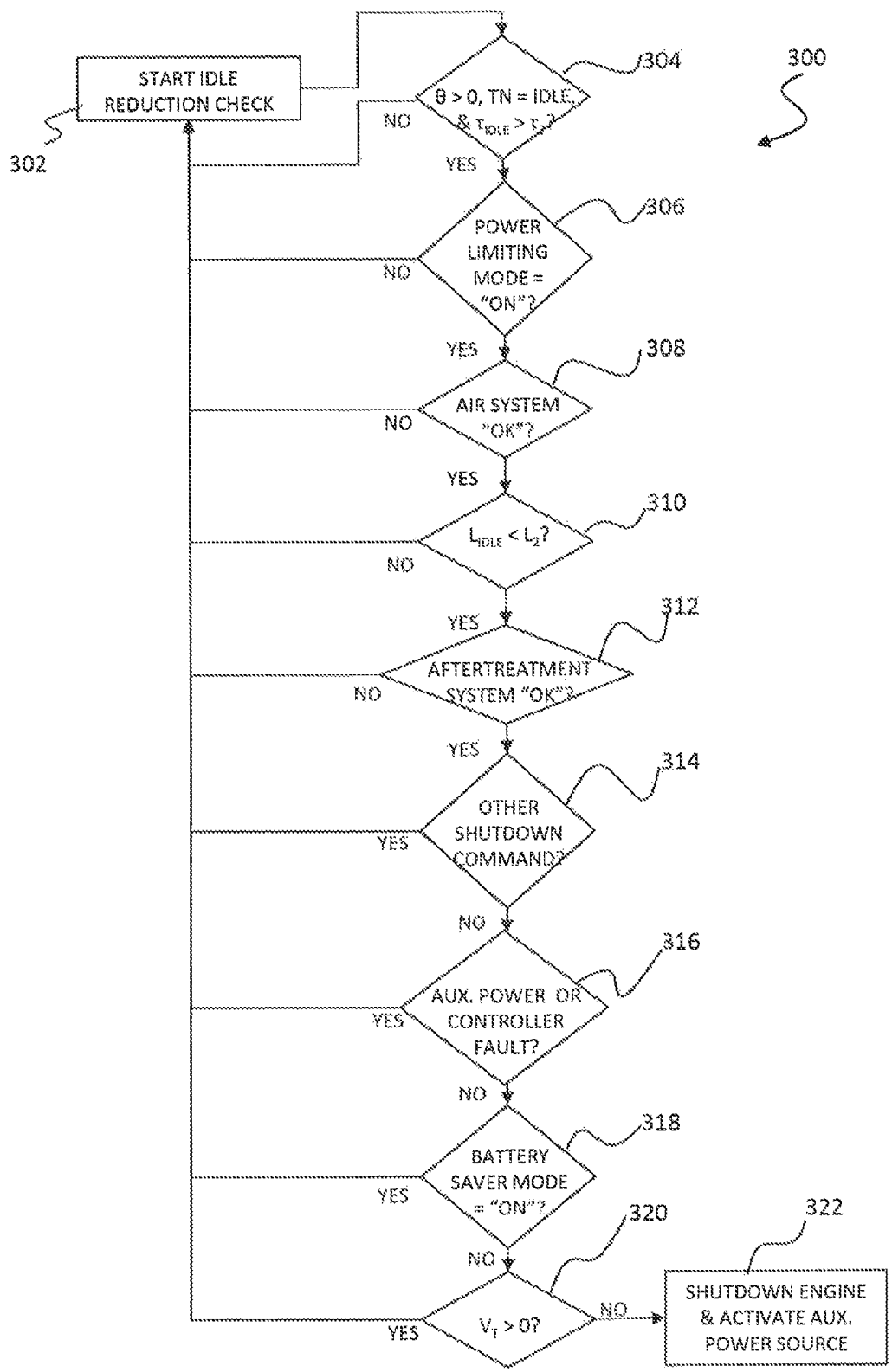
FIG. 3 is a flow chart of an exemplary disclosed idle reduction process that may carried out by the power system of FIG. 1.

Returning to step 218, when the determination is "yes," that is, when throttle selector 44 is in the idle position and $τ_T > τ_2$, controller 34 may proceed to process 300 seen in FIG. 3 to determine whether it is appropriate to shut down engine 12 and activate auxiliary power source 22 for powering consumers 20a-d. When throttle selector 44 is in the idle position, fuel may be conserved by shutting down engine 12 and powering consumers 20a-d via auxiliary power source 22, which may be much smaller than engine 12. However, engine 12 should not be shut down when vital operations of power system 10 require that engine 12 continue running. Before shutting down engine 12, controller 34 may start an idle reduction check (Step 302) to determine if it is appropriate to shut down engine 12 and conserve fuel. Although steps 304-320 describe particular aspects of power system 10 in a particular order, it is understood that fewer or other aspects may be considered in any order.

After starting the idle reduction check at step 302, controller 34 may determine whether the engine speed θ is greater than zero (i.e., that engine 12 is running), whether throttle selector 44 has been moved below a threshold position into the idle position, and whether engine 12 has idled for at least an elapsed time limit ($τ_2$). For example, controller 34 may receive a throttle selection from the operator (indicative of the position of throttle selector 44) and determine whether the selection is below a threshold, such as TN, and is in the idle position. Controller 34 may then track a time elapsed ($τ_{IDLE}$) when the throttle selection is below the threshold selection (e.g., in the idle position), indicating an idle time of engine 12. Controller 34 may then selectively shut down engine 12 and activate auxiliary power source 22 when the elapsed time $τ_{IDLE}$ exceeds the elapsed time limit $τ_2$ after throttle selector 44 is moved to the idle position (Step 304). By tracking $τ_{IDLE}$ and comparing it to $τ_2$, controller 34 can reduce the likelihood that the operator only meant to put throttle selector 44 in idle for a brief period of time. $τ_2$ may be stored in the memory of controller 34 and may represent an amount of idle time after which engine 12 is expected to idle for an extended period of time and can be shut down to conserve fuel. In particular, $τ_2$ may be about 1-2 minutes. It is understood, however, that any amount of time may be used to define $τ_2$ for guarding against prematurely shutting down engine 12. When any of the conditions at step 304 are not satisfied, that is, when the determination at step 304 is "no," controller 34 may return to step 302. When the determination at step 304 is "yes," controller may continue to the next step of process 300.

Controller 34 may also determine whether power system 10 is in a power-limiting mode (Step 306). Power system 10 may be in power-limiting mode when, for example, the coolant temperature of engine 12 drops below a threshold temperature (e.g., 140° F.). When the coolant temperature is below the threshold temperature, the power output of engine 12 may be limited to prevent rapidly increasing the temperature of engine 12, which could cause damage to engine 12. On the other hand, when the coolant temperature is above the threshold temperature (and power-limiting mode is off), shutting down engine 12 may stop the flow of coolant to engine 12, which could allow engine 12 to increase to a temperature that may damage engine 12. Accordingly, when the coolant temperature is above the threshold temperature and power limiting mode is off, engine 12 may continue running in order to gradually cool to the threshold temperature. When the threshold temperature is reached and power limiting mode is on, controller 34 may proceed to the next step of process 300.

Controller 34 may further determine a condition of one or more power consumers 20a that is used during idle operations, such as a compressed air system, and shut down engine 12 based on the condition. For example, controller 34 may determine a pressure of the compressed air system and selectively shut down engine 12 only when the pressure of the compressed air system is above a threshold pressure, such as a minimum activation pressure or charge level (Step 308). For example, the air system of power system 10 may include a main reservoir and a starting reservoir for providing compressed air to the brake system of power system 10. When the main reservoir or the starting reservoir is below a minimum activation pressure or charge level at step 308, controller 34 may return to step 302 to avoid shutting down engine 12. The power of engine 12 may be used to recharge the starting reservoir and the main reservoir before it is shut down in order to avoid the possibility that engine 12 is restarted before a sufficient amount of compressed air is available. It is understood that the air system of power system 10 may include more or different components having particular parameters that may be considered at step 308.

Controller 34 may also determine the total load at idle ($L_{IDLE}$) generated by power consumers 20a-d on alternator(s) 16 and determine whether $L_{IDLE}$ is less than a threshold load ($L_3$) (Step 310). Controller 34 may then selectively shut down engine 12 only when $L_{IDLE}$ is less than $L_3$. For example, $L_3$ may be an output capacity of auxiliary power source 22, such as a load above which auxiliary power source 22 may brown out. $L_{IDLE}$ may be sum of the direct loads placed on companion alternator 16b by power consumers 20a, the critical loads placed by power consumers 20b, and the non-critical loads placed by power consumers 20d. When any of the respective loads or their sum is above a threshold load stored in the memory of controller 34, that is, when the determination at step 310 is "no," controller 34 may return to step 302 to avoid shutting down engine 12 and browning out auxiliary power source 22. When the determination at step 310 is "yes," $L_{IDLE}$ may not brown out auxiliary power source 22 and controller 34 may proceed to the next step of process 300.

Controller 34 may also determine a condition of aftertreatment system 14 and shut down engine 12 based on the condition (Step 312). For example, controller 34 may determine $T_{AT}$ and selectively shut down engine 12 only when $T_{AT}$ is below a threshold temperature ($T_{MIN}$) for limiting a temperature the aftertreatment system. As engine 12 idles, the flow of exhaust through aftertreatment system 14 may help gradually cool aftertreatment system 14 and/or prevent the temperature of aftertreatment system from reaching higher temperatures in the absence of the exhaust flow. Shutting down engine 12 when $T_{AT}$ is above $T_{MIN}$ may eliminate the gradual cooling provided by the exhaust flow, which may result in a rapid temperature increase and could damage aftertreatment devices 30. Also, if aftertreatment devices include a selective catalytic reduction device (SCR) and reductant is being dosed into aftertreatment system 14, controller 34 may avoid shutting down engine 12. The flow of exhaust from engine 12 may help carry reductant through aftertreatment system 14, and controller 34 may avoid shutting down engine 12 when reductant is being dosed in order to avoid reductant deposit formation when the exhaust flow stops. Further, if any of aftertreatment devices 30 are being regenerated, controller 34 may avoid shutting down engine 12 to avoid overheating aftertreatment devices 30. Regeneration processes typically utilize heat and/or fuel from engine 12 to burn away or release and reduce pollutants stored with aftertreatment devices 30. Shutting down engine 12 during a regeneration process may eliminate the exhaust flow, which has a cooling effect that limits the heating of aftertreatment devices 30, thereby risking a sudden increase in temperature (as described above) in aftertreatment system 14 and/or rendering aftertreatment devices 30 only partially regenerated. Thus, when the determination at step 312 is "no," controller 34 may return to step 302 without shutting down engine 12. When the determination at step 312 is "yes," controller 34 may proceed to the next step of process 300.

In some embodiments, engine 12 may receive other shutdown commands generated by controller 34 or by the operator, and controller 34 may check to insure that no other shutdown command is active before proceeding (Step 314). For example, cab 24 may include a shutdown button (or other type of input device) for allowing the operator to manually shut down engine 12. Controller 34 may not alter the shutdown process when the manual shutdown button is active so as to allow the operator to maintain manual control of power system 10. Also, in some embodiments, power system 10 may include an automatic engine start/stop (AESS) system for shutting down engine 12 under certain conditions until a manual action is detected by the operator. If an AESS shutdown process is active, controller 34 may avoid taking control of engine 12 to insure that power system 10 responds to the operator's next manual command according to the control scheme of an AESS shutdown, as expected by the operator. Thus, when a shutdown command is determined to be active, that is when the determination at step 314 is "yes," controller 34 may return to step 302. When the determination at step 314 is "no," controller 34 may proceed to the next step of process 300.

Controller 34 may also determine whether auxiliary power source 22 or controller 34 has a fault before shutting down engine 12 (Step 316). For example, if auxiliary power source is not functioning properly, controller 34 may avoid shutting down engine 12 to avoid the risk that auxiliary power source may not be able to consistently provide power to consumers 20a-d. Further, if controller 34 has a fault (e.g., a fault related to engine 12 or any other component of power system 10), controller 34 may avoid shutting down engine 12 to avoid complicating the diagnosis and/or repair process as the crew works to resolve the fault. Thus when the determination at step 316 is "yes," that is, when there is an active fault, controller 34 may return to step 302. When the determination at step 316 is "no," controller 34 may proceed to the next step of process 300.

In some embodiments, power system 10 may include a battery-saver mode, wherein the operator may manually allow battery-powered portions of power system 10 to remain powered up until the battery dies. Thus, controller 34 may check to insure that battery-saver mode is not on before shutting down engine 12 (Step 318). Because a manual operation is required to initiate battery-saver mode, controller 34 may not take control of engine 12 until the operator has completed the manual operation. When the determination at step 318 is "yes," that is, when battery-saver mode is on, controller 34 may return to step 302 to avoid taking control of the shutdown procedures of engine 12. When the determination at step 318 is "no," controller 34 may proceed to the next step of process 300.

Controller may also check the track speed $V_T$ of power system 10 and determine whether or not $V_T$ is greater than a threshold speed ($V_2$) (Step 320). Controller 34 may selectively shut down engine 12 only when the speed of the machine is below $V_2$ (e.g., less than about 1 MPH). When $V_T$ is greater than the threshold speed, controller 34 may not shut down engine 12 to insure that sufficient power is available and provided to each power consumer 20a-d associated with control of power system 10 (e.g., controller 34, braking system, throttle selector 44, reverser, air system, etc.). When the determination at step 320 is "yes," that is, when $V_T$ is greater than $V_2$, power system 10 may be moving and controller 34 may not shutdown engine 12. When the determination at step 320 is "no," controller may proceed to the next step of process 300.

When controller 34 has passed each step of the idle reduction check of process 300, controller 34 may shut down engine 12 and activate auxiliary power source 22 (Step 322). When auxiliary power source 22 is activated and engine 12 is shutdown, exhaust emissions from engine 12 are reduced while power system 10 is at a track speed below $V_2$. In this way, the average fuel efficiency of power system 10 with respect to $V_T$ is improved and idle emissions are reduced. In embodiments where auxiliary power source 22 is an engine-powered APU, emissions from the APU may be significantly less than that of engine 12 and may also be treated with an exhaust aftertreatment system for adhering to applicable regulations.

As discussed, the disclosed power system 10 may reduce exhaust emissions by maintaining activation temperatures of aftertreatment devices 30 within aftertreatment system 14 and is an improvement over known power systems. Further, power system 10 may reduce idling of engine 12 and supply power to consumers 20a-d with auxiliary power source 22, thereby improving the fuel efficiency of power system 10 while delivering consistent power to consumers 20a-d. Particularly, power system 10 may include controller 34, which may increase the load on engine 12 via alternators 16 in order to raise the temperature of exhaust entering aftertreatment system 14 to a minimum temperature for treating exhaust without limiting power delivered to power consumers 20a-d. Controller 34 may also shut down engine 12 and activate auxiliary power source 22 during idle operations in order to conserve fuel and further reduce emissions after checking that various components of power system 10 (e.g., aftertreatment system 14 and power consumers 20a-d) will not be disrupted or damaged when engine 12 is shut down.

It will be apparent to those skilled in the art that various modifications and variations can be made to the disclosed power system. Other embodiments will be apparent to those skilled in the art from consideration of the specification and practice of the disclosed power system. It is intended that the specification and examples be considered as exemplary only, with a true scope being indicated by the following claims and their equivalents.

What is claimed is:

1. A control system for a machine having an engine, a first alternator, a second alternator, and an aftertreatment system, the control system comprising:
   a sensor associated with the aftertreatment system and configured to determine a temperature of exhaust passing through the aftertreatment system; and
   a controller in communication with the sensor and connectable to the first and second alternators, the controller being configured to:
   determine a speed of the machine;
   determine an available power output of the first alternator;
   determine a load increase of the engine needed to raise the temperature of the exhaust to an operating temperature of the aftertreatment system;
   selectively connect the first alternator to a power consumer to achieve the load increase when the available power output of the first alternator is greater than the load increase;
   selectively connect the second alternator to the power consumer to achieve the load increase when the available power output of the first alternator is less than the load increase; and
   selectively connect at least one of the first and second alternators to the power consumer when the speed of the machine is above a threshold speed.

2. The control system of claim 1, wherein the controller is further configured to:
   determine an available power output of the second alternator; and
   selectively connect the second alternator to the power consumer to achieve the load increase when the available power output of the second alternator is greater than the load increase.

3. The control system of claim 1, wherein:
   the power consumer is configured to receive electrical energy from at least one of the first and second alternators and to dissipate heat energy; and
   the control system further includes an energy recovery unit associated with the power consumer and configured to convert the heat energy dissipated by the power consumer into electrical energy when the first or second alternator is connected to the power consumer.

4. The control system of claim 1, wherein:
   the control system further includes a throttle selector movable from an idle position through a range to a maximum position to affect a speed of the engine; and
   the controller is configured to selectively connect the at least one of the first and second alternators to the power consumer only when the throttle selector is moved to a position below a threshold position.

5. The control system of claim 4, wherein:
   the control system further includes an auxiliary power source that has an output capacity less than the engine; and
   the controller is further configured to:
   track a time elapsed after the throttle selector is moved to the idle position; and
   selectively shut down the engine and activate the auxiliary power source when the elapsed time exceeds an elapsed time limit.

6. The control system of claim 5, wherein the controller is further configured to selectively shut down the engine only when the temperature of the exhaust is below a threshold temperature for limiting a temperature of the aftertreatment system.

7. The control system of claim 5, wherein the controller is further configured to:
   determine a load generated by one or more power consumers; and
   selectively shut down the engine only when the load generated by the one or more power consumers is less than an output capacity of the auxiliary power source.

8. The control system of claim 7, wherein:
   the one or more power consumers includes a compressed air system associated with braking of the machine; and the controller is further configured to:
  determine a pressure of the compressed air system; and
  selectively shut down the engine only when the pressure of the compressed air system is above a minimum activation pressure.

9. The control system of claim 5, wherein the auxiliary power source includes at least one of an engine-powered generator and a battery bank.

10. A method of operating a machine having an engine, a first alternator, a second alternator, and an aftertreatment system, the method comprising:
  receiving a throttle selection from an operator;
  determining a speed of the machine;
  directing exhaust away from the engine through the aftertreatment system;
  determining a temperature of the exhaust;
  determining an available power output of the first alternator;
  determining an engine load increase needed to raise the temperature of the exhaust to an operating temperature of the aftertreatment system;
  selectively connecting the first alternator to a power consumer to achieve the engine load increase when the available power output of the first alternator is greater than the engine load increase;
  selectively connecting the second alternator to the power consumer to achieve the engine load increase when the available power output of the first alternator is less than the engine load increase; and
  selectively connecting at least one of the first and second alternators to the power consumer when the throttle selection is above a threshold selection and the speed of the machine is above a threshold speed.

11. The method of claim 10, further including:
  determining an available power output of the second alternator; and
  selectively connecting the second alternator to the power consumer to achieve the load increase only when the available power output of the second alternator is greater than the load increase.

12. The method of claim 10, further including converting heat energy dissipated by the power consumer into electrical energy when at least one of the first and second alternators is connected to the power consumer.

13. The method of claim 10, wherein:
  the machine further includes an auxiliary power source; and
  the method further includes:
    receiving a throttle selection from an operator;
    tracking a time elapsed when the throttle selection is below a threshold selection; and
    selectively shutting down the engine and activating the auxiliary power source when the elapsed time exceeds a time limit.

14. The method of claim 13, further including:
  determining a load generated by one or more power consumers; and
  selectively shutting down the engine only when the load generated by the one or more power consumers is less than an output capacity of the auxiliary power source.

15. The method of claim 13, further including selectively shutting down the engine only when the temperature of the exhaust is below a threshold temperature for limiting a temperature of the aftertreatment system.

16. The method of claim 14, wherein:
  the one or more power consumers includes a compressed air system associated with braking of the machine; and
  the method further includes:
    determining a pressure of the compressed air system; and
    selectively shutting down the engine only when the pressure of the compressed air system is above a minimum activation pressure.

17. The method of claim 13, wherein activating the auxiliary power source includes activating at least one of an engine-powered generator and a battery bank.

18. A locomotive, comprising:
  an engine;
  a first alternator driven by the engine;
  a second alternator driven by the engine;
  an aftertreatment system connected to receive exhaust from the engine;
  a sensor associated with the aftertreatment system and configured to determine a temperature of exhaust passing through the aftertreatment system;
  a throttle selector movable from an idle position through a range to a maximum position to affect a speed of the engine;
  one or more power consumers connectable to at least one of the first and second alternators;
  an auxiliary power source connectable to the one or more power consumers; and
  a controller in communication with the sensor and connectable to the first and second alternators, the controller being configured to:
    determine an available power output of the first alternator;
    determine an available power output of the second alternator;
    determine a load increase of the engine needed to raise the temperature of the exhaust to a threshold temperature;
    selectively connect the first alternator to at least one of the one or more power consumers to achieve the load increase when the available power output of the first alternator is greater than the load increase; and
    selectively connect the second alternator to the at least one of the one or more power consumers to achieve the load increase when the available power output of the first alternator is less than the load increase and the available power output of the second alternator is greater than the load increase;
    track a time elapsed when the throttle selector is moved to the idle position;
    determine a load generated by one or more power consumers; and
    selectively shut down the engine and activate the auxiliary power source only when the load generated by the one or more power consumers is less than an output capacity of the auxiliary power source and the temperature of the exhaust passing through the aftertreatment system is below a threshold temperature for limiting a temperature the aftertreatment system.

* * * * *